(12) United States Patent
Andaluz Sorli (10) Patent No.: US 10,115,545 B2
(45) Date of Patent: Oct. 30, 2018

(54) ACTUATING METHOD AND DEVICE FOR A HELICOIDAL SWITCH

(71) Applicant: GORLAN TEAM, S.L.U., Amorebieta (Vizcaya) (ES)

(72) Inventor: Jose Oscar Andaluz Sorli, Zaragoza (ES)

(73) Assignee: GORLAN TEAM, S.L.U. (ES)

( * ) Notice: Subject to any disclaimer, the term of this patent is extended or adjusted under 35 U.S.C. 154(b) by 0 days.

(21) Appl. No.: 15/518,671

(22) PCT Filed: Nov. 6, 2015

(86) PCT No.: PCT/ES2015/070796
§ 371 (c)(1),
(2) Date: Apr. 12, 2017

(87) PCT Pub. No.: WO2016/071554
PCT Pub. Date: May 12, 2016

(65) Prior Publication Data
US 2017/0236662 A1    Aug. 17, 2017

(30) Foreign Application Priority Data

Nov. 7, 2014 (EP) ...................................... 14382446

(51) Int. Cl.
*H01H 3/08* (2006.01)
*H01H 19/00* (2006.01)
(Continued)

(52) U.S. Cl.
CPC ......... *H01H 19/6355* (2013.01); *F16H 25/12* (2013.01); *H01H 3/40* (2013.01); *H01H 19/635* (2013.01); *H01H 3/42* (2013.01)

(58) Field of Classification Search
CPC ........ H01H 19/00; H01H 19/10; H01H 19/14; H01H 19/20; H01H 19/36; H01H 19/60; H01H 2003/00; H01H 2003/02; H01H 2221/024; H01H 2221/028; H01H 19/6355; H01H 19/635; H01H 3/40; H01H 3/00; H01H 3/02; H01H 3/08; H01H 3/32; H01H 3/42; H01H 3/54; H01H 3/50; F16H 25/12
(Continued)

(56) References Cited

U.S. PATENT DOCUMENTS 2,951,138 A    8/1960   Petrino
3,432,742 A *  3/1969   St Clair .................. H02M 1/30
                                                       200/185
2011/0011368 A1  1/2011  Raether

FOREIGN PATENT DOCUMENTS

DE    659975 C    5/1938
DE    899060 C   12/1953
(Continued)

*Primary Examiner* — Anthony R. Jimenez
(74) *Attorney, Agent, or Firm* — Hayes Soloway PC (57) ABSTRACT

The present invention relates to an actuating method and device which allows mechanically converting rotational movement into helicoidal movement, said helicoidal movement including considerable travel in the axial direction. To that end, the device comprises a rotating rod (1) inside a fixed outer body (2). The rod (1) comprises an emerging lug (4) sliding between two parallel surfaces (3) of the outer body (2), said parallel surfaces (3) being inclined with respect to the axial axis (5) of the rod (1).

11 Claims, 7 Drawing Sheets

(51) Int. Cl.
*H01H 19/14* (2006.01)
*H01H 21/00* (2006.01)
*H01H 19/635* (2006.01)
*F16H 25/12* (2006.01)
*H01H 3/40* (2006.01)
*H01H 3/42* (2006.01)

(58) Field of Classification Search
USPC .......................................................... 200/336
See application file for complete search history.

(56) References Cited

FOREIGN PATENT DOCUMENTS

GB 172751 A 12/1921
WO 9845163 A2 10/1998

* cited by examiner

ACTUATING METHOD AND DEVICE FOR A HELICOIDAL SWITCH

OBJECT OF THE INVENTION

The present invention relates to the technical field of the mechanical conversion of movements, and it particularly relates to a method and device for generating a helicoidal and reversible actuating movement for actuating an electric switch in which the moving portions thereof move in a helicoidal manner.

BACKGROUND OF THE INVENTION

There are applications, such as certain electric switches, for example, requiring activation of a rotor that performs a turning movement inside a fixed stator for connecting and disconnecting internal contacts. The generation of the actuating or operating movement is particularly problematic in special applications, for example when helicoidal movement of the rotor is to be obtained, because in that case it is necessary to have mechanical devices generating said helicoidal movement by means of transforming rotational movement, conventionally provided by an external switch actuation mechanism.

A simple way to achieve said helicoidal movement from a turning movement would be to provide a screw and a thread, such that when rotating the screw inside the thread, forward movement along the axial axis is added to the rotation, achieving the desired helicoidal movement. Nevertheless, this solution has a series of problems and limitations. First of all, said solution is only valid for systems requiring a reduced forward movement along the axial axis.

However, for applications requiring considerable longitudinal travel associated with a small angular turn, as in the case of a rotary electric switch, the thread pitch necessary for achieving said transformation exceeds the limitations of existing machinery for machining screws, i.e., the machinery existing today is unable to obtain large thread pitches. For example, by using a lathe to obtain said threading, an extremely rapid rate of forward movement of the cutting tool with respect to the turning of the part to be threaded would be necessary for the part acting as a nut which has an inner machining, and machinery that is capable of performing said task is currently unknown.

In the second place, the longitudinal forward movement direction is determined by the turning direction of the screw. In other words, in the event of continuous rotational movement in a single direction, the screw will move forward or backward until reaching maximum travel. Once said maximum travel has been reached, it is necessary to change the direction of the rotational movement of the screw to generate helicoidal movement in the reverse direction. However, there are applications in which rotational movement in a constant direction has to be transformed into helicoidal movement incorporating a back and forth or reversible movement. In other words, once the maximum travel has been reached, the helicoidal movement continues without stopping but it changes to an opposite longitudinal direction without modifying the turning direction for that purpose.

Therefore, there is still a need in the state of the art for an actuating device that is able to transform rotational movement into helicoidal movement and back and forth movement, furthermore being able to obtain considerable longitudinal travel with reduced rotation.

DESCRIPTION OF THE INVENTION

The present invention solves the problems described above by means of an actuating device and method which very simply converts small turns of rotational movement into helicoidal movement with considerable longitudinal travel, all by means of a simple part formed by only a rotary rod provided with a radial lug sliding over a guide, said guide being formed by two parallel surfaces inclined with respect to the axial axis of said rod. The two parallel surfaces are formed in independent bodies.

Therefore, a first aspect of the invention relates to an actuating device comprising a rotating rod introduced in an axial through hole of a fixed outer body. The rotating rod comprises a lug emerging radially with respect to the axial axis of the rod, said lug being housed in a guide formed in the outer body. Said guide is formed by two surfaces that are parallel to one another and inclined with respect to the axial axis of the rod, such that the lug is arranged tightly between said surfaces so it can slide over them, making contact with both surfaces at all times, so the movement of the lug and therefore the movement of the rod to which it is attached, is determined by the spatial position of said parallel surfaces.

When one of the ends of the rod is subjected to a turning or rotational movement with respect to said axis, the lug travels along the guide, incorporating longitudinal translation into the rotational movement, and therefore turning it into helicoidal movement, helicoidal movement being understood as the simultaneous combination of turning movement with respect to an axis, together with a movement comprising linear forward movement along that same axis.

Another feature of the invention is that it achieves said helicoidal movement being in a reversible direction, i.e., it follows a back and forth path. According to the invention, this means that by maintaining the same direction of rotation of the rod, once one of the ends of the longitudinal translation thereof has been reached, the guiding surfaces force the lug, and therefore the rod, to change their direction of axial travel, which moves back in the opposite direction until returning to the initial position, being able to repeat this back and forth movement indefinitely.

The guiding surfaces can be obtained very easily by manufacturing a body with a preferably cylindrical axial through hole, and then by making in said body a simple planar yet inclined cut with respect to the axis of the cylinder, so the use of conventional threading machinery is not necessary because only a cutting tool is needed. This manufacturing ease also prevents drawbacks associated with limitations in the thread pitch of conventional screws discussed above, which allows freely designing the axial travel associated with a specific turning angle by simply modifying inclination of the guide with respect to the axial hole of the body in which the rod will be housed.

The rod preferably comprises a first end arranged for receiving rotational movement, for example provided by a conventional actuation mechanism, said rotational movement being the movement that will be converted into helicoidal movement by means of the invention. A second end of the rod is configured for acting like a rotor with helicoidal movement inside a stator of a rotary electric switch, or else said second end of the rod can be configured for being coupled to a rotor of a rotary switch.

The rod preferably comprises one or more longitudinal recesses along all or part of its length suitable for facilitating rotation of the rod inside the outer body as friction between the outer surface of the rotating rod and the inner surface of the fixed body is reduced. The emerging lug also preferably has a semi-spherical shape that allows it to be housed tightly while at the same time facilitating its travel between the two inclined guiding surfaces of the outer body.

A second aspect of the invention relates to an actuating method that is able to convert rotational movement into helicoidal movement. To that end, the method comprises inducing said rotational movement in a first end of a rod introduced in a fixed outer body. Said rod comprises a lug emerging radially with respect to the axial axis of the rod, the lug being housed between two parallel surfaces of the outer body, inclined with respect to said axial axis. In the event of the rod turning, the method comprises sliding the lug along the guide formed by the two guiding surfaces parallel to one another, thereby incorporating longitudinal travel into the rotational movement, and leading to the desired helicoidal and back and forth movement.

The method comprises coupling a second end of the rod to a moving component of an electric switch having helicoidal movement to cause the actuation thereof.

The method preferably comprises favoring rotation of the rod by means of one or more longitudinal recesses in the main body of said rod, as well as by means of using a semi-spherical lug.

A third aspect of the invention relates to a rotary switch operated through helicoidal movement of a rotor inside a stator, the helicoidal movement of the rotor being obtained by transformation of rotational movement by means of an actuating device according to that described in the first aspect of the present invention.

The device, method and switch of the invention allow simple and efficient mechanical transformation of movements and incorporating back and forth movement into the helicoidal movement. Furthermore, the elements necessary for the invention are easy to manufacture and can readily be adapted to different ratios of longitudinal travel by angle of rotation.

DESCRIPTION OF THE DRAWINGS

For the purpose of aiding to better understand the features of the invention according to a preferred practical embodiment thereof and to complement this description, the following illustrative and non-limiting drawings are attached as an integral part thereof:

FIG. 3 shows several views of the device of the preceding figures in specific rod turning position, where FIGS. 3A and 3E are perspective views, FIGS. 3C and 3D are side elevational views, and FIG. 3B is a front elevational view. Parts of the outer body 2 have been omitted from FIG. 3E to help better see the rotating rod 1.

PREFERRED EMBODIMENT OF THE INVENTION

Figure 1:
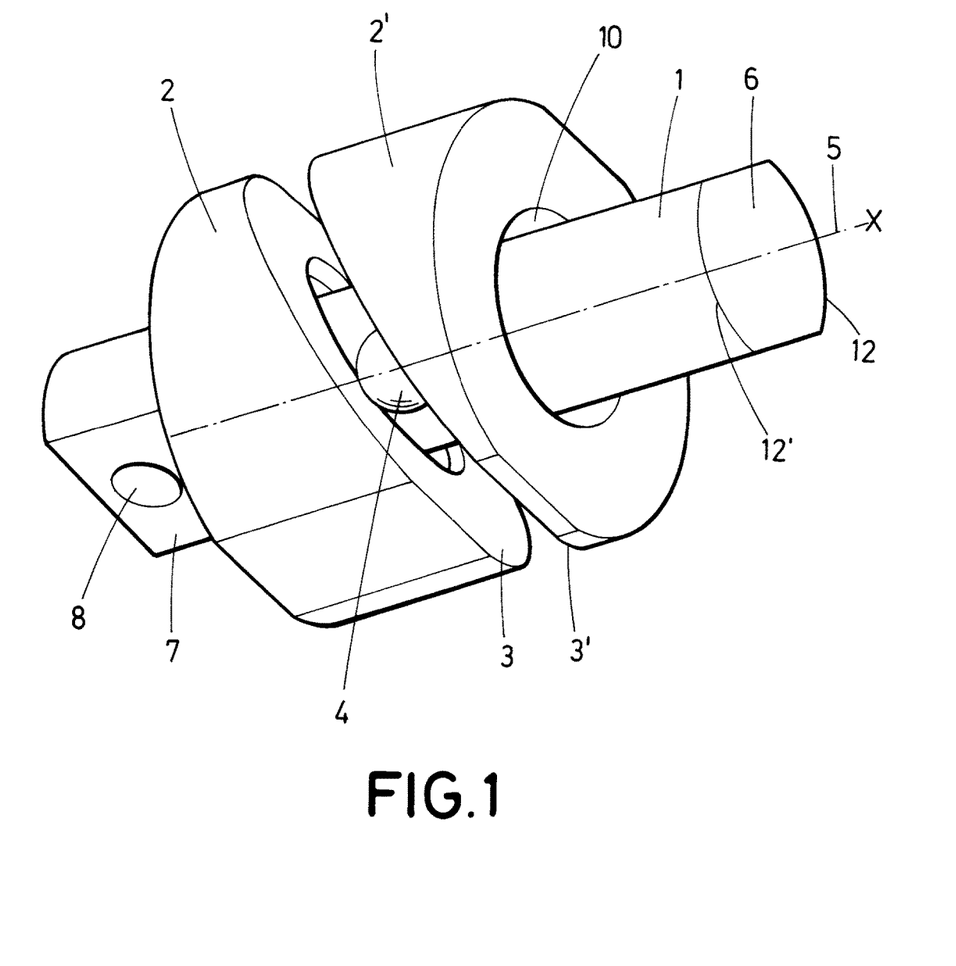
FIG. 1 shows a perspective view of the actuating device according to a preferred embodiment of the invention.

FIG. 1 shows a perspective view of a preferred embodiment of the actuating device of the invention, whereby the steps of a preferred embodiment of the method of the invention are in turn implemented. The device comprises a rotating rod 1 introduced in a preferably cylindrical through cavity 10, i.e., it longitudinally goes through a fixed outer body 2, which is fixed in an external structure, for example an electric switch (not depicted) during device operation. The preferably metallic fixed body 2 in turn comprises two separate independent parts 2, 2' defining between them a guide formed by two parallel surfaces 3, 3', a lug 4 of the rod 1 being housed between said parallel surfaces 3, 3'. Said lug 4 is preferably semi-spherical and emerges radially with respect to the longitudinal axis 5 of the rod 1. The surface 3 is formed in part 2, and the other surface 3' is formed in the other body 2'.

The lug 4 can consist of a metal sphere partially housed in a cavity of the rod 1, held by pressure.

The rod 1 comprises a first end 6 emerging from one end of the fixed body 2 for being coupled to a conventional external actuation mechanism (not depicted) to induce the initial rotational movement in the rod. At the end opposite of the fixed body 2, the rod 1 comprises a prolongation 7 with a through hole 8, said prolongation 7 being able to be coupled to a rotor having helicoidal movement inside the stator of a device to be actuated, usually an electric switch, as will be explained below in relation to FIG. 7.

Figure 2:
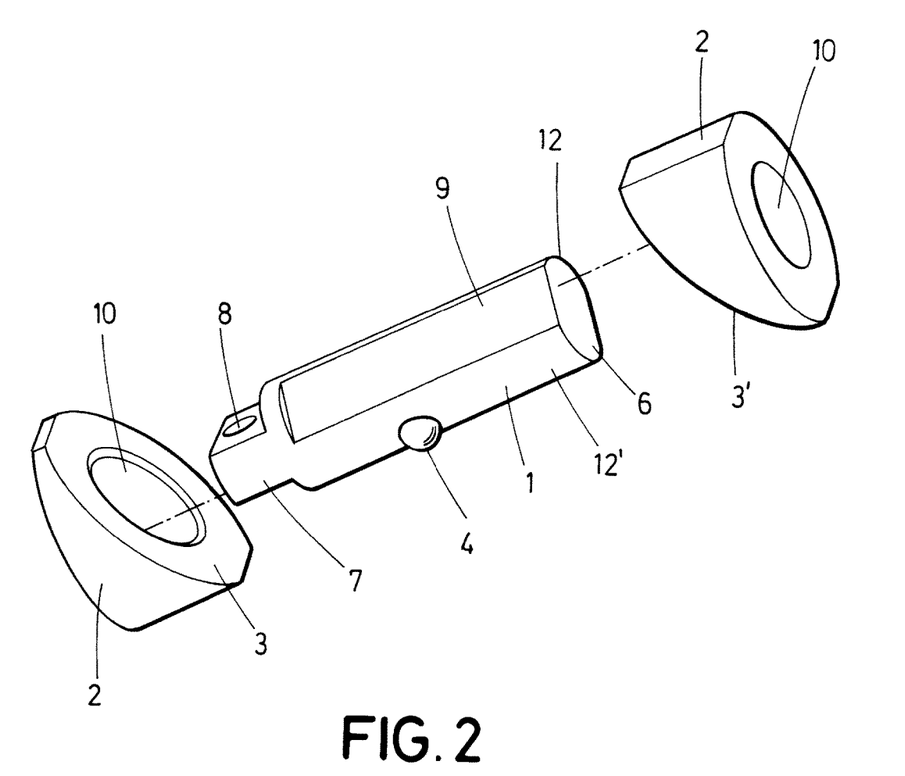
FIG. 2 shows another exploded perspective view of the device of FIG. 1, where it can be seen that the device is formed by only four parts.

FIG. 2 shows an exploded view of the same elements of FIG. 1 forming the actuating device. It can be seen that the rod 1 is a generally cylindrical body on which two parallel recesses 9 have been made for defining two outer diametrically opposed curved surfaces 12, 12', with a curvature coinciding with the curvature of the through cavity 10, so that the rod can slide over the cavity, facilitating rotation thereof inside the fixed body 2. In other embodiments of the invention, the rod 1 can have any other section or any other number of recesses provided that it allows rotation thereof on the through cavity 10 of the fixed body 2.

In turn, the fixed body 2 is cylindrical for the most part, the central area thereof being interrupted by a planar and oblique cut that gives rise to the guiding surfaces 3 that are parallel to one another. That cut is a through cut, i.e., it transversely goes through the body 2, such that the guiding surfaces 3 are accessible from outside the fixed body 2.

Said planar cut is inclined with respect to the axial axis (X) of the cylinder, and the inclination and position thereof is halfway between the two ends of the body 2. It must again be noted that the fixed body 2 can have any other outer shape, provided that it allows housing the rotating rod 1 and has guiding surfaces 3 for guiding the lug 4. For example, the outer body can be integrated in a parallelepiped, or in any shape meeting the described requirements.

The inclination of the parallel surfaces 3 is adapted according to the axial travel to be obtained in the event of a specific angle of rotation. The greater the inclination with respect to the plane perpendicular to the axial axis (X), the more axial travel occurs.

The guiding surfaces 3 can be obtained by means of cutting a single part with the desired angle, giving rise to parts 2, 2', or else by means of manufacturing the two parts 2, 2' separately. In any case, manufacture of the actuating device is simple and can be readily adapted to considerable axial travel, without being subjected to the limitations of any type of machining equipment.

Figure 3:
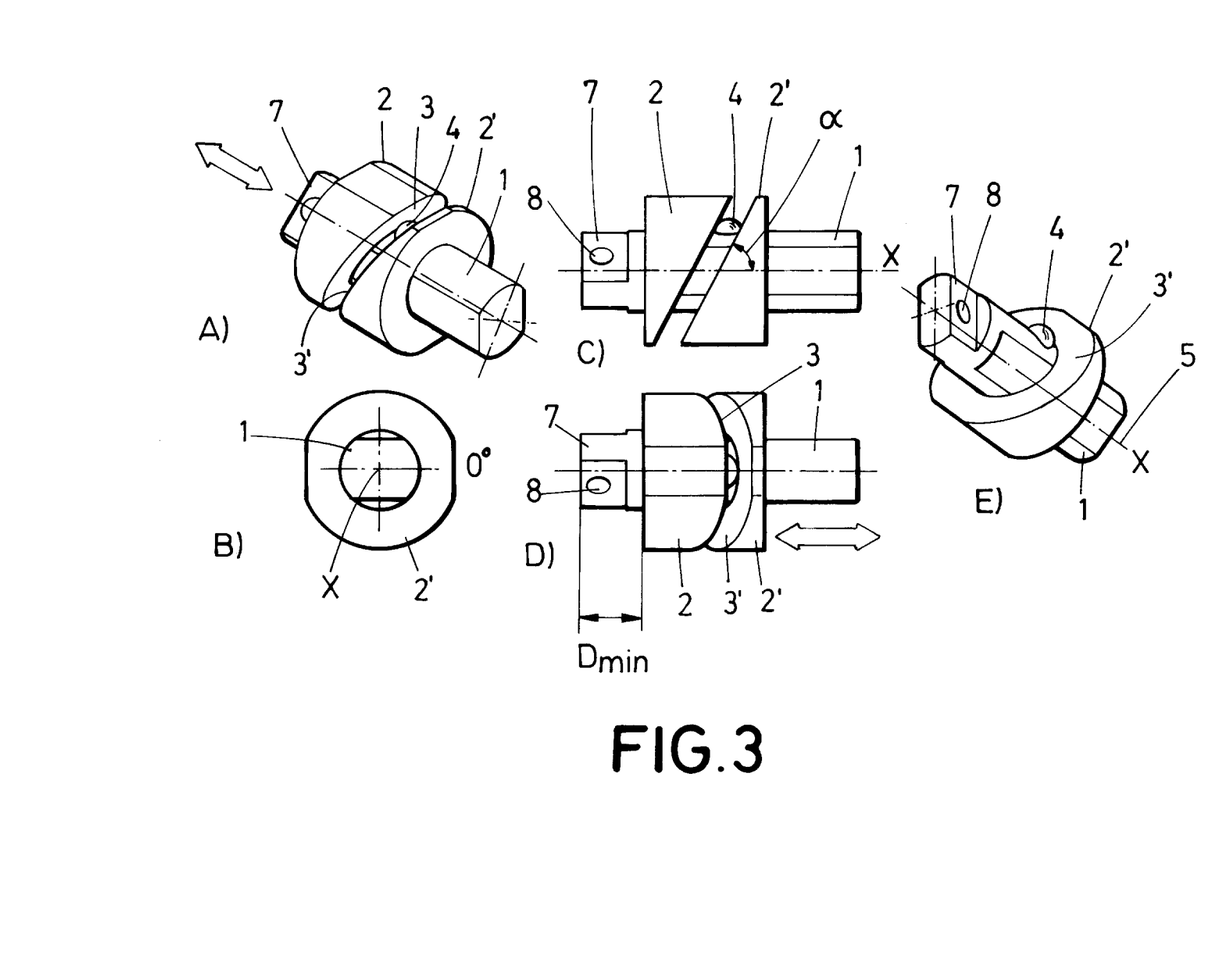

FIGS. 3 to 6 illustrate the working of the actuating device, showing four rotation positions thereof. FIG. 3 shows an initial position 0° in which the lug is in the position of the guide formed by the two guiding surfaces 3, 3' farthest away from the prolongation 7. Therefore, said prolongation 7 emerges from the fixed body 2 a minimum distance $D_{min}$.

Figure 4:
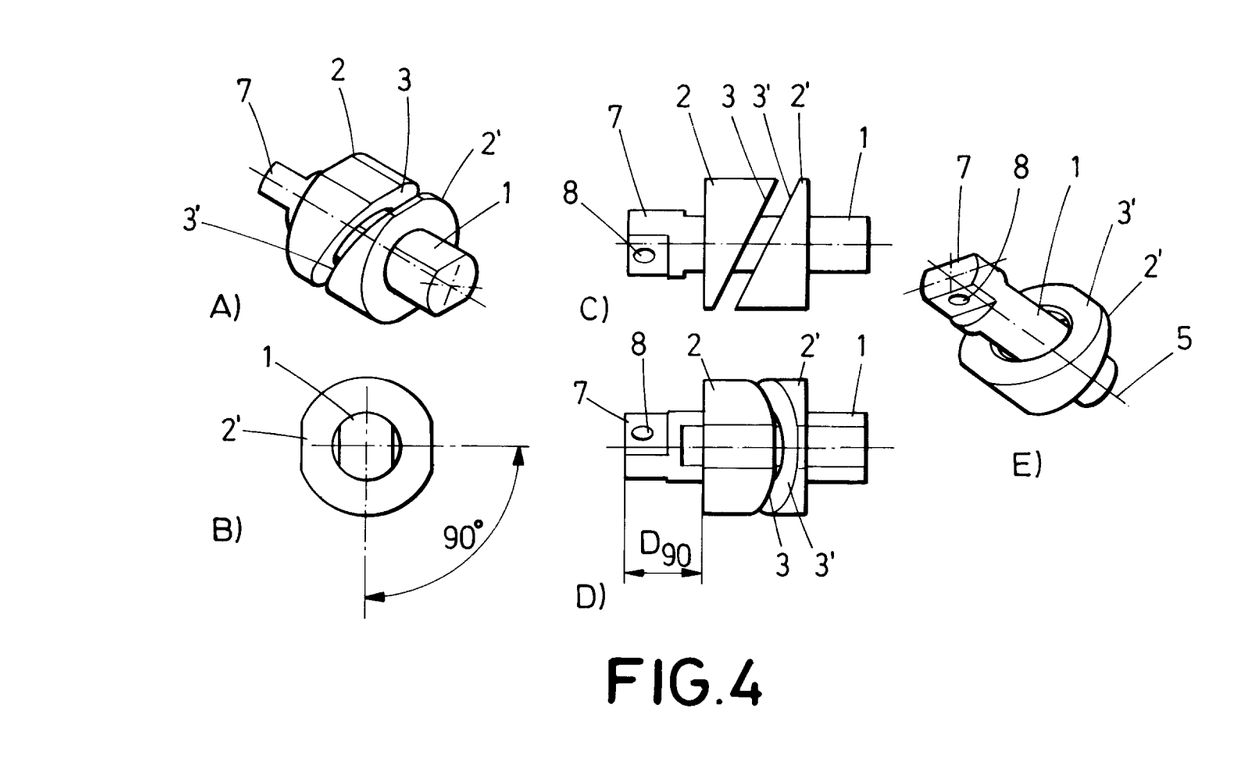
FIGS. 4, 5 and 6 are views similar to those of FIG. 3 but in other rod turning positions.

In FIG. 4, the first end 6 of the rotating rod 1 is turned 90 degrees. Upon turning, the lug 4 moves forward along the guide until reaching an intermediate point of said guide. It must be noted that in the drawing, lug 4 is concealed by the rod 1 itself. The axial travel forced by the parallel surfaces 3 on the lug 4 forces the rod 1 to travel axially, the prolongation 7 emerging an intermediate distance $D_{90}$. The particular value of said intermediate distance for a 90° turn can be chosen by simply changing the angle of inclination (α) of the guiding surfaces 3 with respect to the axis X.

In this preferred embodiment shown in the drawings, said angle of inclination (α) is close to 45°, but in other preferred embodiments it can be any angle ranging between 0° and 90°, excluding 0° and 90°.

Figure 5:
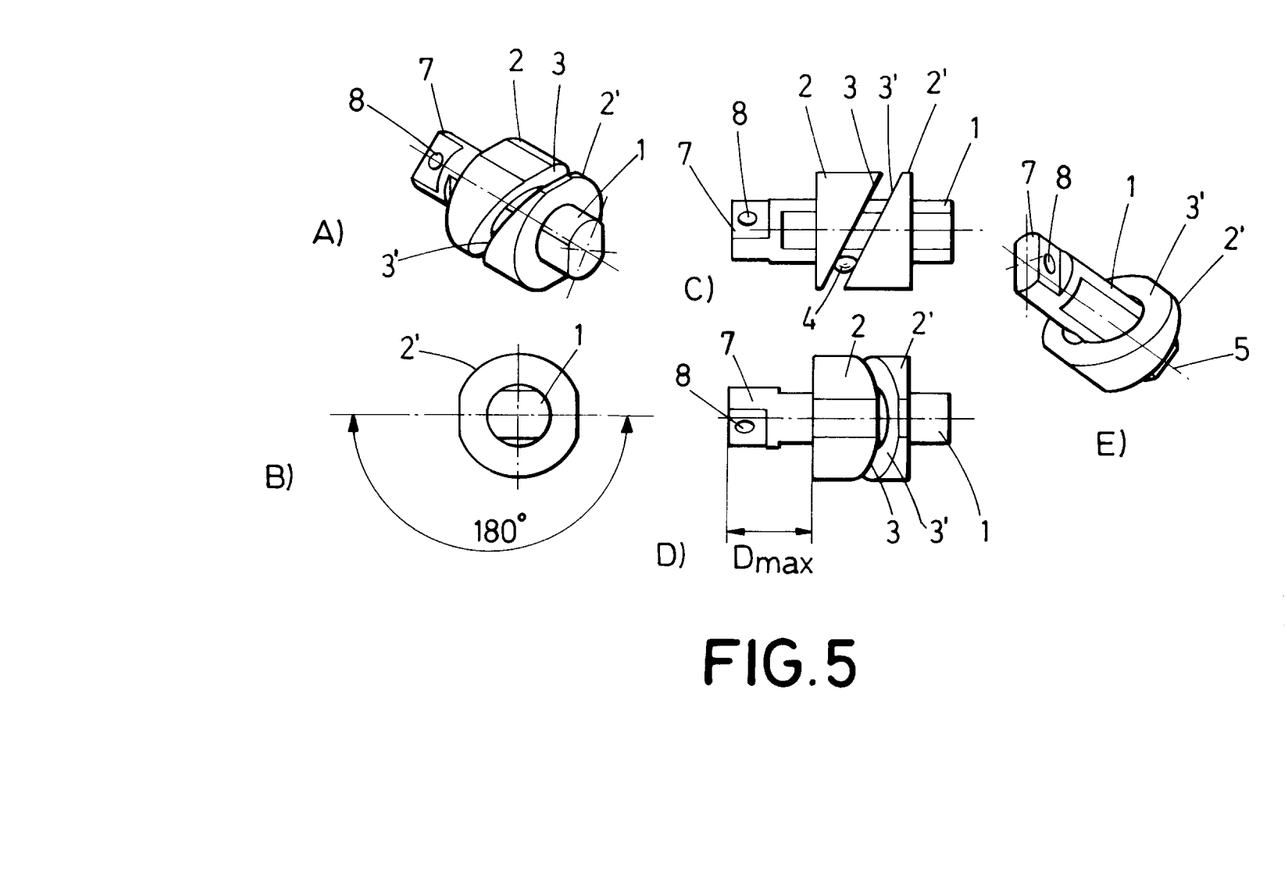

In FIG. 5, the rod 1 rotates another 90° with respect to the position of FIG. 4 and in the same rotation direction, such that the lug 4 travels to the end of the guide farthest away from its initial position. As a result, the rod 1 reaches its greatest axial travel and the prolongation 7 emerges from the fixed body 2 a maximum distance $D_{max}$.

Figure 6:
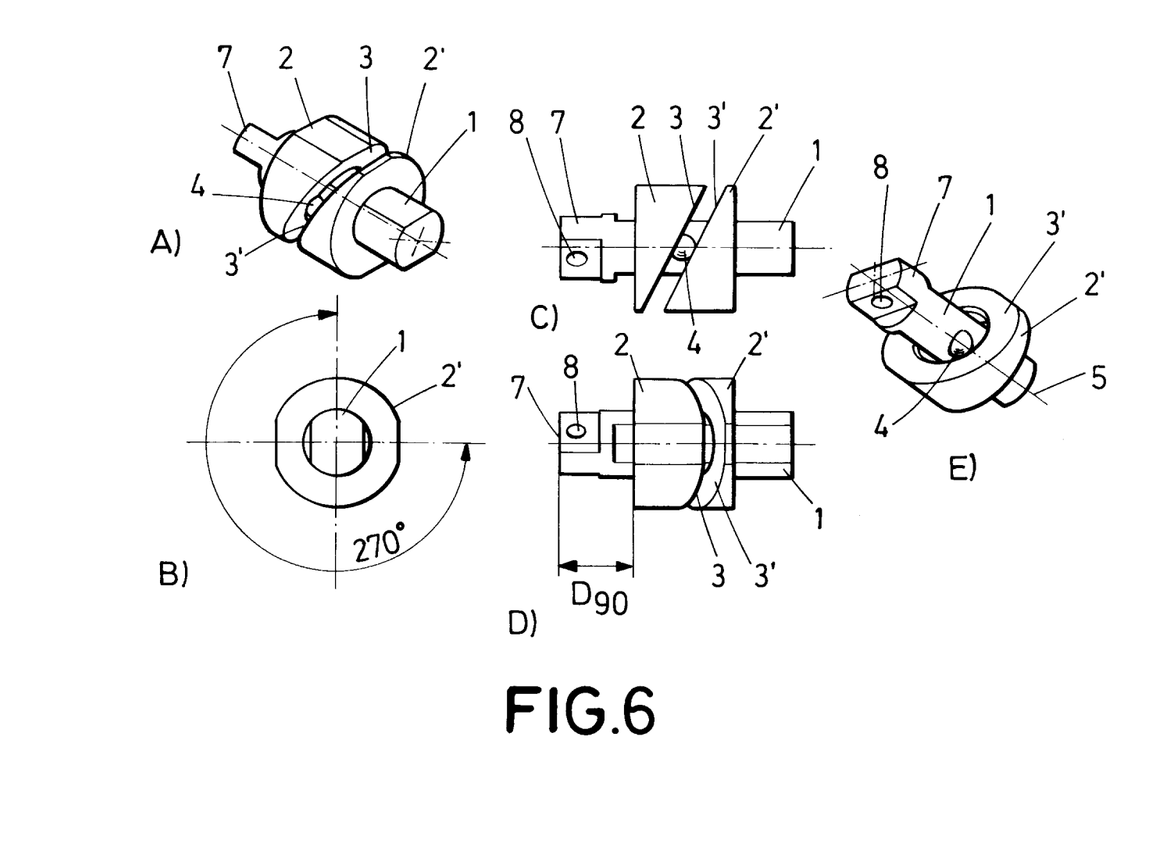

Once the end of axial travel has been reached, if the rod 1 is still rotating in the same direction as shown in FIG. 6, the lug 4 continues rotating but the configuration of the fixed body 2, specifically the two guiding surfaces 3, 3', forces it to move back in the axial direction. In the particular case of the drawing, for a 270° rotation the prolongation 7 moves back until emerging the same intermediate distance $D_{90}$. Another 90 degree turn from said position would return the device to its initial position shown in FIG. 3.

In summary, the annular configuration of the guiding surfaces 3, 3' and the arrangement thereof around the axis (X) coinciding with the axial axis 5 of the rod 1 adds longitudinal travel to the initial rotational movement, thereby obtaining helicoidal movement, said longitudinal travel furthermore being in a reversible direction, because it moves back and forth in the event of continued rotation in one and the same rotation direction.

Figure 7:
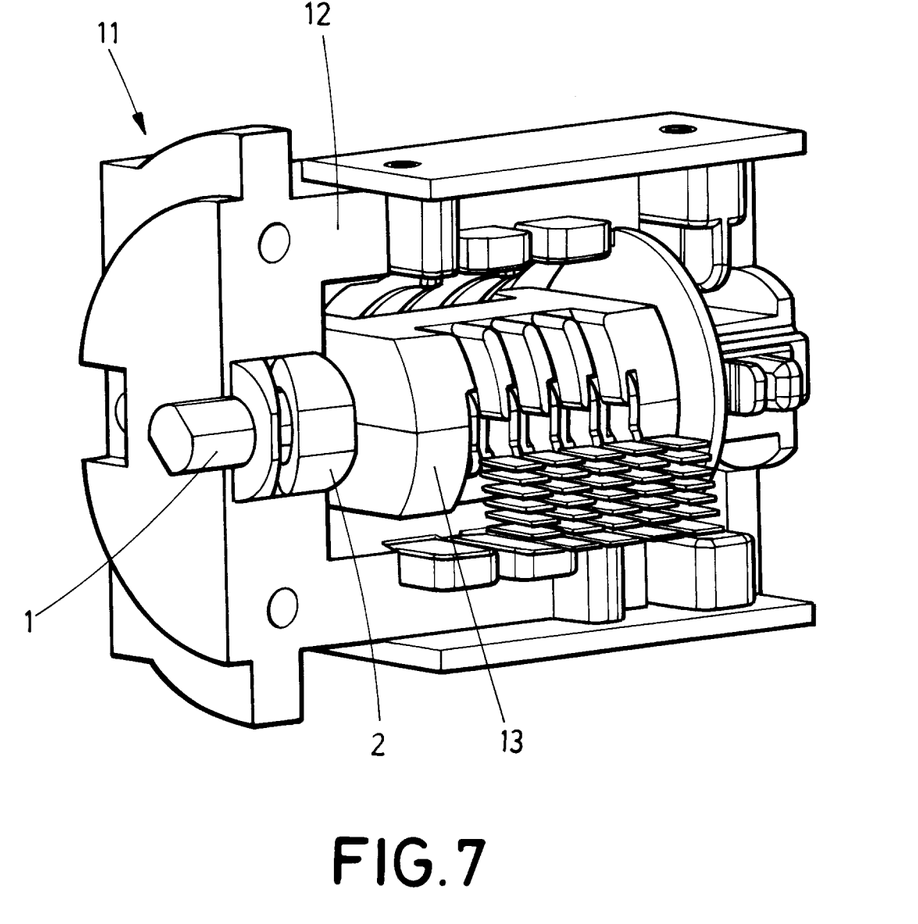
FIG. 7 is a perspective view of the device of the invention in use, i.e., coupled to a helicoidal electric switch to cause helicoidal movement of the rotor of said switch.

Finally, FIG. 7 shows an electric switch 11 comprising a stator 12 and a rotor 13 housed inside the stator 12, where the rotor can travel inside the stator with respect to both rotation direction and longitudinal travel direction. The switch comprises an actuating device 1, 2 like the one described above, such that the rod 1 is coupled to the rotor 13 of the switch 11, and therefore said rotor 13 will perform said helicoidal movement inside the stator in order to connect and disconnect the contacts of the switch. The fixed body 2 is mounted in the stator 12 in a fixed manner.

The invention claimed is:

1. An actuating device for mechanically converting rotational movement into helicoidal movement, the actuating device comprising:
a fixed body having a through cavity extending along an axis, said fixed body being provided with two guiding surfaces parallel to one another and arranged in an inclined manner,
a moving rod housed such that it has the capacity for movement in said through cavity, the moving rod being provided with a lug emerging radially with respect to an axial axis of the rod,
wherein said lug is arranged tightly between said guiding surfaces, such that it can slide over them, making contact with both surfaces; and
wherein the guiding surfaces comprise an annular shape arranged around the through cavity, and where the guiding surfaces are accessible from outside the fixed body.

2. The actuating device according to claim 1, where the moving rod comprises a first end emerging from one end of the fixed body, and a second end emerging from another of the fixed body, and where the second end is suitable for being coupled to a rotor of an electric switch.

3. The actuating device according to claim 1, where the through cavity is cylindrical and the moving rod comprises two outer diametrically opposed surfaces, with a curvature coinciding with the curvature of the cavity.

4. The actuating device according to claim 1, where the fixed body is formed by independent portions.

5. The actuating device according to claim 1, where the lug has a width substantially coinciding with a gap between the two guiding surfaces.

6. The actuating device according to claim 5, where the lug has a spherical or semi-spherical portion.

7. An electric switch comprising:
a stator and a rotor housed inside the stator, where the rotor can travel inside the stator, and
an actuating device according to claim 1 coupled to the rotor to cause the helicoidal movement thereof.

8. The actuating device according to claim 1, wherein the annular shape of the guiding surfaces is closed.

9. The actuating device according to claim 1, wherein the guiding surfaces are planar.

10. A method for mechanically converting rotational movement into helicoidal movement, the method comprising:
rotating a rod in a guided manner between two independent fixed bodies, said rod comprising a lug emerging radially with respect to an axial axis of the rod;
sliding said lug between two annular parallel surfaces formed in the independent fixed bodies, said parallel annular surfaces being inclined with respect to the axial axis of the rod.

11. The method of claim 10, wherein the step of rotating further comprises rotating the rod 360 degrees.

\* \* \* \* \*